United States Patent [19]

Satake

[11] 3,925,771

[45] Dec. 9, 1975

[54] VOLTAGE CHECKING MEANS FOR AN ELECTRIC CIRCUIT EMPLOYING TWO POWER SOURCES

[75] Inventor: Yoshihiro Satake, Tokyo, Japan

[73] Assignee: Copal Company Limited, Tokyo, Japan

[22] Filed: July 18, 1974

[21] Appl. No.: 489,713

[30] Foreign Application Priority Data
July 19, 1973  Japan.......................... 48-84907[U]

[52] U.S. Cl. ................ 340/249; 324/29.5; 324/133; 340/221; 354/60 E
[51] Int. Cl.² ..................G01N 27/46; G03B 17/18; G01R 19/16
[58] Field of Search ............ 324/51, 133, 140, 29.5; 340/248 A, 248 B, 248 C, 249, 221; 307/235

[56] References Cited
UNITED STATES PATENTS

| | | | |
|---|---|---|---|
| 2,762,978 | 9/1956 | Norton............................ | 324/140 R |
| 2,993,172 | 7/1961 | Karlicek........................... | 324/133 |
| 3,001,088 | 9/1961 | Jochems et al. .................... | 307/235 |
| 3,003,108 | 10/1961 | Thiele............................. | 307/235 X |
| 3,025,414 | 3/1962 | McVey............................. | 340/248 A |
| 3,037,151 | 5/1962 | Cimerman et al. ......... | 324/140 R X |
| 3,289,193 | 11/1966 | Worthington et al........... | 340/248 A |
| 3,348,199 | 10/1967 | Jorgensen....................... | 307/235 X |
| 3,452,347 | 6/1969 | Stimson ......................... | 324/133 X |
| 3,600,606 | 8/1971 | Clor................................ | 307/235 |
| 3,769,577 | 10/1973 | Schnur et al.................... | 324/133 X |

*Primary Examiner*—Gerard R. Strecker
*Attorney, Agent, or Firm*—Cushman, Darby & Cushman

[57] ABSTRACT

A voltage checking means capable of properly checking power-source voltages in an electric circuit employing two power sources connected in series, said voltage checking means comprising two pairs of resistors respectively connected in series to the respective power sources, transistors respectively connected to connecting points of respective pairs of the resistors, and an indicating element connected between the collectors of said respective transistors.

2 Claims, 3 Drawing Figures

VOLTAGE CHECKING MEANS FOR AN ELECTRIC CIRCUIT EMPLOYING TWO POWER SOURCES

BACKGROUND OF THE INVENTION

1. Field of the invention

The present invention relates to a power-source voltage checking means and, more particularly, to improvement of a checking means for the power-source voltage in an electric circuit employing two power source batteries.

2. Description of the prior art

Conventional voltage checking means for an electric circuit employing two power sources are arranged, as shown in FIG. 1, by connecting resistors $R_1$ and $R_2$ in series to two power sources $E_1$ and $E_2$, which are connected to each other in series, and at the same time, by connecting a transistor $T_1$ operating by using the voltage divided by resistors $R_1$ and $R_2$ as a detecting level, the voltage is checked for example by a light-emitting diode LED connected as the load for said transistor $T_1$.

The above-mentioned conventional means, however, is to check the voltage by the sum of voltages of two power sources. Therefore, when the voltage of one power source is higher than the specified value and sum of voltages of both power sources is larger than the sum of pre-determined voltages of both power sources, the voltage is indicated as a whole as a value higher than the pre-determined value, even when the voltage of the other power source is lower than the pre-determined value. As a result, it is erroneously acknowledged that voltages of respective power sources are both higher than the pre-determined value and, consequently, that particular electric device is kept operated under that unfavourable condition.

SUMMARY OF THE INVENTION

It is, therefore, an object of the present invention to provide a voltage checking means capable of indicating, when the voltage of either power source out of two power sources is lower than the pre-determined value, that the voltage of one of said power sources is lower than the pre-determined value.

The above-mentioned object of the present invention can be attained by connecting level detecting circuits to respective power sources and, at the same time, leading the outputs of said level detecting circuits and an AND circuit, an indicating element being actuated by an AND output of said AND circuit.

DETAILED DESCRIPTION OF THE PREFERRED EMBODIMENT

Figure 1:
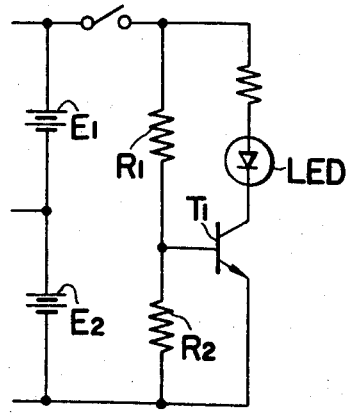
FIG. 1 shows a circuit diagram illustrating an example of conventional voltage checking means.
Figure 2:
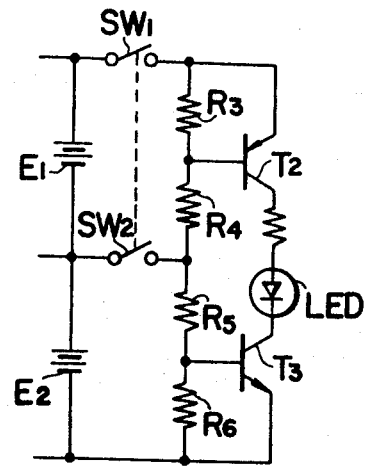
FIG. 2 shows a circuit diagram illustrating an embodiment of the voltage checking means according to the present invention.

In FIG. 2, reference symbols $E_1$ and $E_2$ respectively represent power-source batteries to be checked which are connected in series. Reference symbols $R_3$ and $R_4$ respectively represent resistors connected in series across both terminals of the power-source battery $E_1$ through switches $SW_1$ and $SW_2$ which are interlocked with each other. Reference symbols $R_5$ and $R_6$ respectively represent resistors connected in series across both terminals of the power-source battery $E_2$ through the switch $SW_2$. The resistors $R_3$, $R_4$, $R_5$ and $R_6$ constitute voltage level detecting circuits. Reference symbol $T_2$ represents a transistor having a base connected to the connecting point of resistors $R_3$ and $R_4$ and also having an emitter connected to one terminal of the resistor $R_3$. Reference symbol $T_3$ represents a transistor having a base connected to the connecting point of resistors $R_5$ and $R_6$ and also having an emitter connected to one terminal of the resistor $R_6$. Said transistors $T_2$ and $T_3$ respectively operate by using respective divided voltages of power-source batteries $E_1$ and $E_2$ as detecting levels, said divided voltages being respectively produced by resistors $R_3$ and $R_4$ and resistors $R_5$ and $R_6$, said transistors $T_2$ and $T_3$ thus constituting an AND circuit. Reference symbol LED represents a light-emitting diode connected between respective collectors of transistors $T_2$ and $T_3$ and serving as an indicating element. Respective resistance values of resistors $R_3$ and $R_4$ and resistors $R_5$ and $R_6$ are selected so that transistors $T_2$ and $T_3$ can be made conductive by closing of switches $SW_1$ and $SW_2$ only when voltages of power-source batteries $E_1$ and $E_2$ are respectively higher than the pre-determined values.

Therefore, if the voltage of one power source battery out of two power source batteries $E_1$ and $E_2$ is lower than the pre-determined value, when switches $SW_1$ and $SW_2$ are closed, one transistor corresponding to that power-source battery is turned off even if the sum of voltages of power-source batteries $E_1$ and $E_2$ is larger than the sum of pre-determined values for respective batteries and, therefore, the light-emitting diode LED does not emit light. Thus, checking of voltages of respective power-source batteries can be carried out properly.

Figure 3:
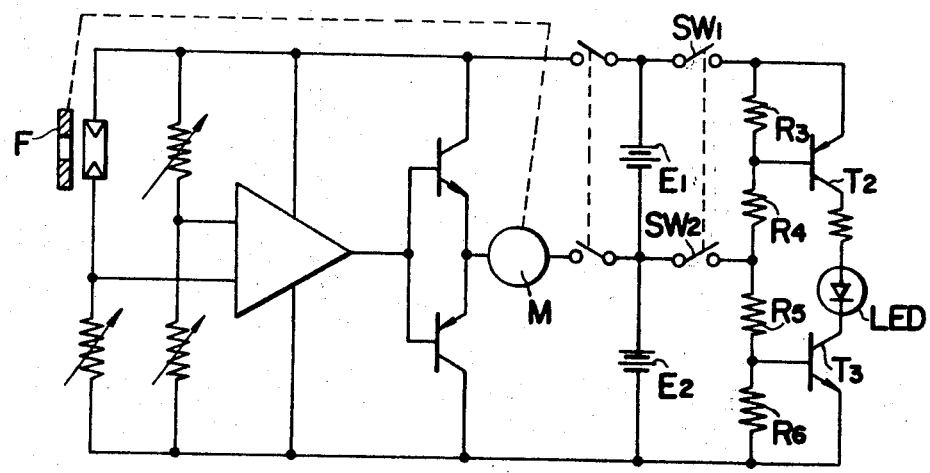
FIG. 3 shows a circuit diagram illustrating the voltage checking means according to the present invention shown in FIG. 2 incorporated in a servo-circuit for controlling a diaphragm means of a cinecamera.

As an example of a circuit having two power sources, a servo-circuit for controlling the diaphragm means for cinecameras as shown in FIG. 3 is known widely. In said circuit, it is essential for proper control of the diaphragm means that voltages of two power sources are respectively higher than pre-determined values. If photographing by under-exposure condition (the condition that intensity of light is insufficient even when the diaphragm F is fully opened and the controlling circuit is still operating to further open the diaphragm though the diaphragm cannot be further opened mechanically) is continued for a long time in the above-mentioned circuit, a voltage drop occurs for one power-source battery which is supplying electric current at that time to the servo-motor M for operating the diaphragm F. Besides, said power-source batteries $E_1$ and $E_2$ are used for driving a zooming motor which is not illustrated. According to difference of the zooming speed, both power source batteries are used simultaneously in some cases and only one power source battery is used in other cases. If the latter case occurs frequently, the voltage of only one power source battery drops. Therefore, the voltage checking means according to the present invention is remarkably effective when it is applied to said kind of electric circuit.

Besides, as the indicating element LED, an ordinary lamp, buzzer, etc. can be used instead of the light-emitting diode.

I claim:

1. A voltage checking means comprising:
   a first power-source battery for an electric circuit,
   a second power-source battery for said electric circuit connected in series to said first power-source battery,
   a first pair of resistors connected in series with one another and connected across the terminals of said first power-source battery,
   a second pair of resistors connected in series with one another and connected across the terminals of said second power-source battery,
   a first transistor having a base electrode connected to the connecting point of said first pair of resistors,
   a second transistor having a base electrode connected to the connecting point of said second pair of resistors, and
   an indicating element connected between the collector electrodes of said first and second transistors for providing an indication in response to the voltage level of either or both of said batteries falling below a predetermined level.

2. A voltage checking means according to claim 1 in which said indicating element is a light-emitting diode.

* * * * *